United States Patent
Tachibana (10) Patent No.: US 9,170,095 B1
(45) Date of Patent: Oct. 27, 2015

(54) DISTANCE DETECTION DEVICE AND METHOD INCLUDING DYNAMICALLY ADJUSTED FRAME RATE

(71) Applicant: Sony Corporation, Tokyo (JP)

(72) Inventor: Makoto Tachibana, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/247,751

(22) Filed: Apr. 8, 2014

(51) Int. Cl.
  *G01C 3/08* (2006.01)
  *G01B 11/14* (2006.01)

(52) U.S. Cl.
  CPC ...................... *G01B 11/14* (2013.01)

(58) Field of Classification Search
  CPC ........ G01C 3/08; G01C 15/002; G01S 17/89; G01S 7/4817; G01S 17/42
  USPC ........... 356/3.01, 4.01, 4.07, 5.01, 5.09, 3.09, 356/9, 625
  See application file for complete search history.

(56) References Cited

U.S. PATENT DOCUMENTS

| | | | | |
|---|---|---|---|---|
| 5,828,407 | A | * | 10/1998 | Suzuki .......................... 348/312 |
| 2009/0079960 | A1 | * | 3/2009 | Chung ............................ 356/28 |
| 2011/0051119 | A1 | * | 3/2011 | Min et al. ....................... 356/5.1 |

FOREIGN PATENT DOCUMENTS

| | | |
|---|---|---|
| JP | 2005-323180 A | 11/2005 |
| JP | 2008-85548 A | 4/2008 |

* cited by examiner

*Primary Examiner* — Isam Alsomiri
*Assistant Examiner* — Samantha K Abraham
(74) *Attorney, Agent, or Firm* — Oblon, McClelland, Maier & Neustadt, L.L.P.

(57) ABSTRACT

A device including an emitter that transmits light in a series of frames, wherein each frame in the series includes at least one pulse. The device includes a receiver that receives, for each frame in the series, the at least one pulse reflected from a target, and generates, in response to receiving the at least one pulse in a current frame, an output for calculating a distance between the target and the device for the current frame. The device includes circuitry that calculates, for each frame in the series, the distance between the target and the device based on the receiver output. The circuitry dynamically controls a frame rate for each frame in the series based on the distance calculated in a frame immediately preceding the current frame, and controls the emitter such that the at least one pulse is emitted in the current frame at the calculated frame rate.

10 Claims, 10 Drawing Sheets

| FRAME # | FRAME #1 | FRAME #2 | FRAME #3 | FRAME #4 | FRAME #5 | ... |
|---|---|---|---|---|---|---|
| NUMBER OF PULSES | n1 | n1 | n1 | n2 | n2 | ... |
| OUTPUT DISTANCE | d1 | d2 | d3 | d4 | d5 | ... |
| FRAME RATE | FR0 | FR0 | FR0 | FR1 | FR1 | ... |

| DISTANCE [m] | 0-1 | 1-2 |
|---|---|---|
| FRAME RATE [fps] | 50 | 40 |

FIG. 4B

| DISTANCE [m] | 0-1 | 1-2 | 2- |
|---|---|---|---|
| FRAME RATE [fps] | 60 | 50 | 40 |

DISTANCE DETECTION DEVICE AND METHOD INCLUDING DYNAMICALLY ADJUSTED FRAME RATE

BACKGROUND

1. Technical Field

The present disclosure relates to time-of-flight (TOF) distance measurement devices and methods.

2. Description of Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

As one type of distance detection technology, there exists a TOF system including a three-dimensional distance sensor that measures the flight time of light emitted from a light-emitting device and reflected from a target to a light-receiving device. The distance of the target relative to the emitter/receiver may be calculated based on the time of flight and known properties related to the speed of light.

SUMMARY

In distance detection devices implementing TOF techniques, the quantity of emitted light from the light-emitting device greatly influences the precision of the distance measurements performed with such devices. Accordingly, the number of light-emitting elements included in the TOF device, the size of the light-emitting elements, and the power consumption of the light-emitting elements may be optimized based on a given application-specific detection distance. However, in implementations such as mobile terminals (e.g., smartphones, tablets, etc.) in which size reduction and power efficiency are important practical and operational concerns, the aforementioned optimization of light-emitting elements can prove difficult. As a result, distance detection accuracy can worsen at long ranges in such implementations.

In one or more embodiments, a distance detection device includes a light emitter configured to transmit light in a series of frames, wherein each frame in the series of frames includes at least one light pulse. The distance detection device may include a light receiver configured to receive, for each frame in the series of frames, the at least one light pulse when the at least one light pulse is reflected from a target. The light receiver may be further configured to generate, in response to receiving the at least one light pulse in a current frame of the series of frames, an output for calculating a distance between the target and the distance detection device for the current frame. The distance detection device may include circuitry configured to calculate, for each frame in the series of frames, the distance between the target and the distance detection device based on the output of the light receiver, dynamically control a frame rate for each frame in the series of frames based on the distance calculated in a frame immediately preceding the current frame, and control the light emitter such that the one or more light pulses are emitted in the current frame at the frame rate calculated based on the distance in the immediately preceding frame.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout the several views.

Figure 1:
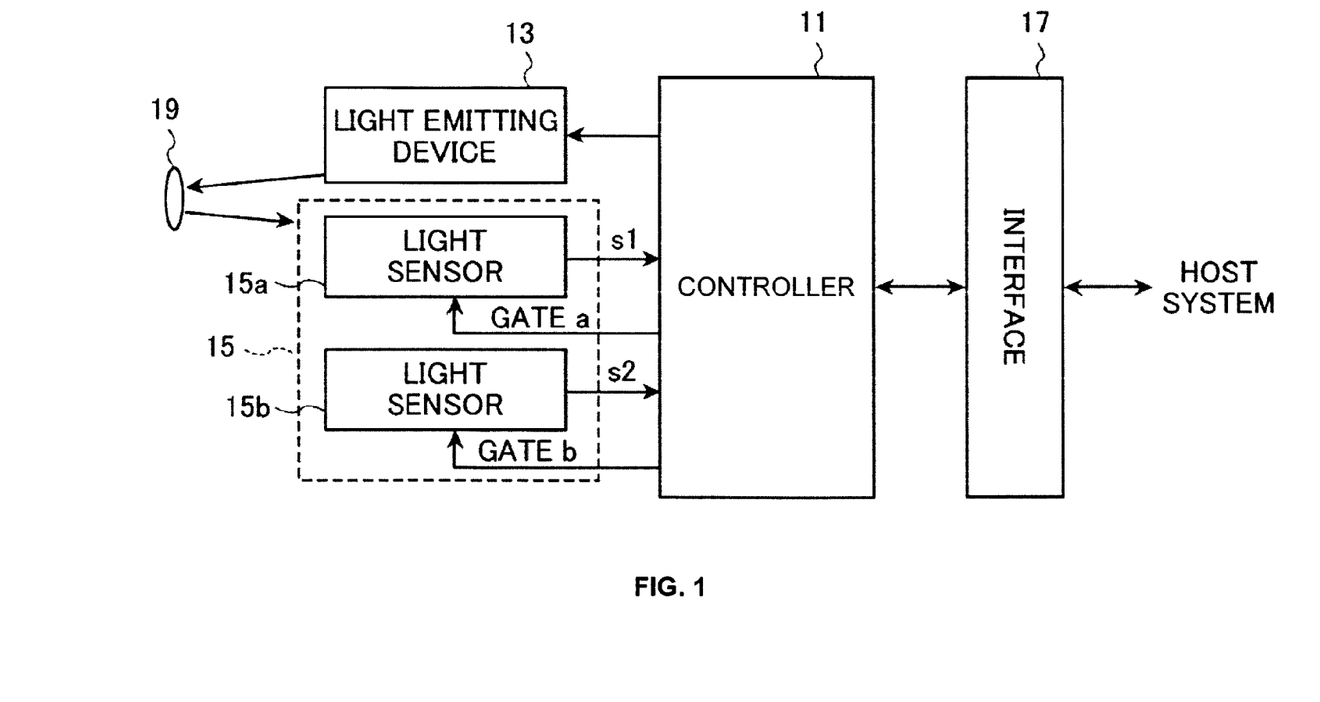
FIG. 1 illustrates a non-limiting exemplary block diagram corresponding to a system including a TOF distance detection device, according to certain embodiments.

FIG. 1 illustrates a non-limiting exemplary block diagram corresponding to a system including a TOF distance detection device, according to certain embodiments.

A distance detection device according to the example of FIG. 1 includes a controller 11, a light emitting device 13, a light reception device 15, and an interface 17.

The controller 11 may include one or more central processing units (CPUs), and may control each element in the distance detection device to perform features related to various signal processing, including the processing and algorithms described herein.

The light emitting device 13 is a light source which generates a beam of invisible light such as infrared (IR) light. The emitted light may be transmitted toward an object 19, which is an object of a distance detection performed by the distance detection device. In one or more embodiments, the light emitting device 13 may include one or more infrared light emitting diodes (LEDs). In one or more embodiments, the light emitting device 13 generates pulse-form light of a predetermined period (light emission interval) under control of the controller 11.

The light reception device 15 receives light transmitted by the light emitting device 13 and reflected from the object 19. In response to receiving the reflected light, the light reception device 15 generates a signal indicating a light quantity and light reception time corresponding to the received light. In one or more embodiments, the light reception device 15 may include one or more of a photodiode, a CMOS sensor, a CCD sensor, or the like, for generating the output signal based on the light quantity and the light reception time. In the example of FIG. 1, the light reception device 15 includes a first optical light sensor 15a and a second optical light sensor 15b. Each of the light sensors 15a and 15b may respectively output a signal s1 and s2 corresponding to a stored charge amount generated in response to receiving light transmitted by the light emitting device 13 and reflected from the object 19. As mentioned previously, the signals s1 and s2 may correspond to an indication of stored charge accumulated based on the light quantity and the light reception time of the received light.

Distance detection processing described herein is not limited to any structure with respect to the distance detection device, and other structural elements not explicitly shown or discussed herein may be applied in a TOF distance detection system according to the present disclosure. For example, first and second light sensors 15a and 15b in the example of FIG. 1 share a single photoelectric element for converting received light into electricity. However, in certain embodiments, two electrical storage circuits can be arranged in parallel in the latter stage of the light reception device 15, and the two electrical storage circuits may be connected by a switch in order to form a structure that switches a single photoelectric element to two electrical storage circuits via the switch.

The first and second light sensors 15a and 15b may be respectively controlled by a gate signal "GATE a" and "GATE b" transmitted by the controller 11 in synchronization will light emission from the light emitting device 13. The gate signals GATE a and GATE b control the first and second light sensors 15a and 15b by operating in a gate window of a predetermined phase difference. Aspects of controlling the first and second light sensors 15a and 15b via the gate signals will be discussed in greater detail in later paragraphs.

The interface 17 is connected between the controller 11 and a host system. The interface 17 acts as a communication interface between the controller 11 and the host system such that instructions may be passed to and from the host system and the controller 11. Additionally, the interface 17 provides a communication pathway for transmitting to the host system distance data calculated by the controller 11. Interface 17 may be a wired communication interface or a wireless communication interface.

In a TOF distance detection system, distance may be measured with respect to a distance detection device by detecting the phase difference of light emitted from the light emitting device 13 and the received light received at the light reception device 15. In the case of the TOF distance detection system according to the example of FIG. 1, a phase difference of the transmitted and received light is not detected based on a time stamp of the input and output light pulse, but instead is detected based on the accumulated amount of electrical charge in the light sensors 15a and 15b, which are synchronized in accordance with the light transmission. Measuring a phase difference (time) between a light transmission and light reception is not an accurate method of performing distance detection in a TOF system due to the poor temporal resolution with respect to the speed of light. Accordingly, determining a distance based on stored electrical charge generated in response to received light reflected from an object, as in the present disclosure, provides the benefit of improved accuracy with respect to simple phase difference measurements relying on a time difference. The two light sensors provided in the distance detection device according to FIG. 1 may convert the stored electrical charge generated in response to the received light into a voltage, and the resolution of the distance detection may be indirectly raised by scaling.

Figure 2:
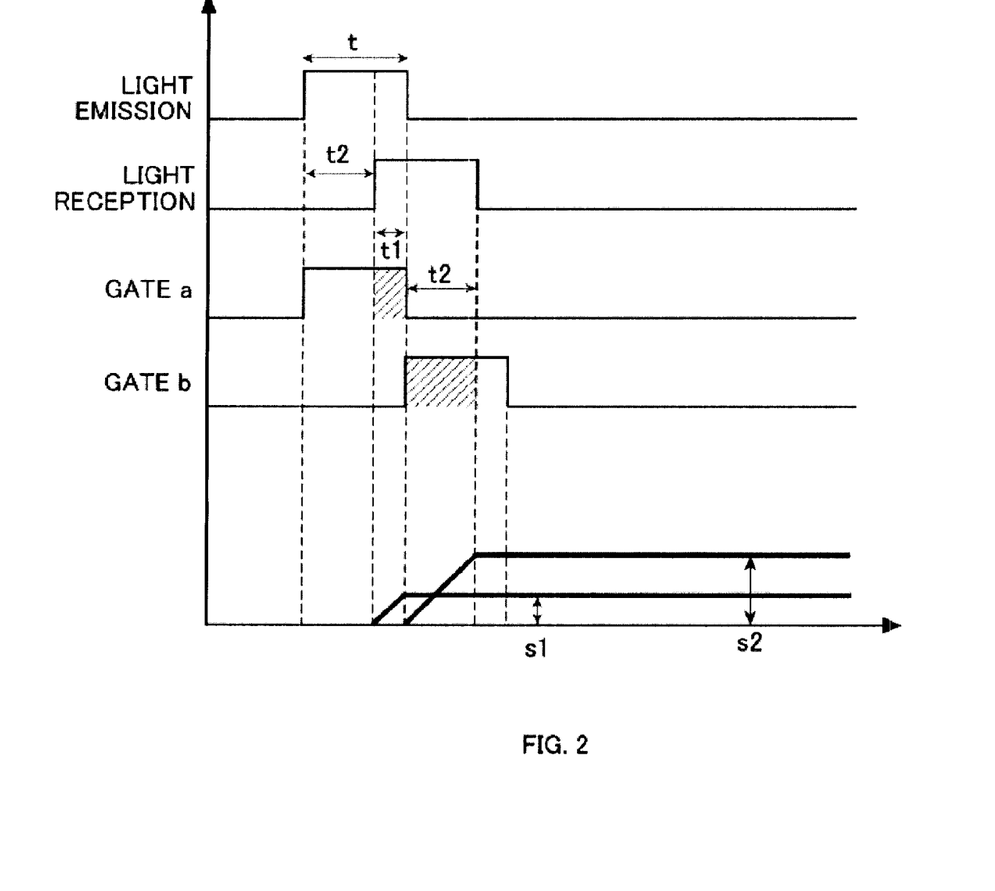
FIG. 2 illustrates a non-limiting exemplary timing diagram for a TOF distance detection device, according to certain embodiments.

Next, FIG. 2 illustrates a non-limiting exemplary timing diagram for a TOF distance detection device, according to certain embodiments. The exemplary timing diagram of FIG. 2 will now be utilized to demonstrate the principle of operation of the distance detection apparatus shown in FIG. 1.

Referring to FIG. 2, the waveform of "LIGHT EMISSION" shows a light pulse that has a pulse width t emitted from the light emitting device 13. The waveform of "LIGHT RECEPTION" shows a light pulse that has been emitted from the light emitting device 13 and reflected by the object 19 such that it is received by the light reception device 15. This example assumes that a time t2 passes between the initial transmission of the light pulse by the light emission device 13 and the reception of the light pulse by the light reception device 15. The waveforms corresponding to "GATE a" and "GATE b" illustrate gate signals that respectively control gate windows corresponding to the first and second light sensors 15a and 15b. The gate signals in this example have a pulse waveform and comprise the gate window which designates the period corresponding to the width of the gate pulse for activating the light sensors 15a and 15b. In this example, the width of the gate windows corresponding to the gate signals is the same as the width t of the light pulse emitted by the light emission device 13. In this example, the gate window of the light sensor 15a is generated at a same timing as the light pulse emitted from the light emitting device 13. Additionally, the gate window corresponding to the light sensor 15b is generated at a predetermined time difference (phase difference) relative to the light sensor 15a. This time difference for transmitting the respective gate signals is assumed in the present example to equal the width t of the light pulse emitted from the light emitting device 13.

As illustrated in the lower portion of the graph shown in FIG. 2, because the gate window corresponding to the light sensor 15a is controlled by the gate signal GATE a and consequently charge is stored in response to receiving light within this gate window, a charge amount s1 is accumulated during the time period in which light is received by the light sensor 15a within its gate window (i.e., the time t1 illustrated by the hashed area under the GATE a pulse). The light sensor 15b operates in the gate window according to the gate signal in GATE b, and the accumulated charge generated in response to receiving light within this gate window results in the stored charge amount s2. The gate window corresponding to the light sensor 15b starts at the finish time of the "LIGHT EMISSION" pulse, and the "LIGHT RECEPTION" is finished when time t passes from that point in time. Therefore, the storage time of the electrical charge according to the light reception amount of the light sensor 15b is restricted to the light received in the time t2.

The following formula (1) may be formed to describe the distance D between the distance detection device and an object as a function of the speed of light c and the time t2.

$$D=(c*t2)/2$$

Moreover, as for the relationship between the time t, the time t2, and the charge amounts s1 and s2, the following formula (2) may be formed.

$$t2 = \{s2/(s1+s2)\} * t$$

The following formula (3) may be derived from the formulas (1) and (2):

$$D = (c*t/2) \times s2/(s1+s2)$$

From formula (3), the distance D can be calculated based on the known time t and the amounts s1 and s2 of measured stored electrical charges.

As mentioned previously, when the quantity of light received by a light sensor becomes relatively small because the distance between the detected object and the distance detection device becomes large, detection accuracy will fall and the resolution and signal-to-noise ratio at the time of the accumulated charge amount calculation will be insufficient with respect to the accumulated amount of electrical charge. As a countermeasure against the decrease in accuracy due to a small quantity of light received at the light sensor, it is possible to adjust a parameter like the power of a light emitting diode that transmits the light pulse. Additionally, the emission time of the light may be adjusted.

For the purposes of the present disclosure, a frame refers to a unit of one detection process of distance performed based on at least one light emission (e.g., LED irradiation) and light reception. Further, a frame rate corresponds to the number of objects of the frame included per unit time (for example, one second). While the above-mentioned countermeasure against decreased accuracy due to decreased electrical charge detection from a light sensor (i.e., increasing the transmission power and/or the transmission time of a light pulse for measuring the distance) may be effective in some implementations, this countermeasure becomes impractical and/or unavailable in relatively smaller device implementations such as mobile devices (e.g., smartphones, etc.).

As an alternative to counteracting decreased detection accuracy as a result of low electrical charge detection, embodiments of the present disclosure may ensure sufficient distance detection accuracy by dynamically changing a frame rate and a frequency of light emission per frame rate while measuring the distance in a state with fixed emission power, fixed emission time, and fixed light emission interval. When a light emission interval is made constant, changing a frame rate means changing the frequency of light emission (namely, the number of light emission pulses) contained in one frame.

Generally, if a frame rate is made low, since the frequency of light emission utilized for one distance detection can be increased, detection accuracy will become acceptable. On the other hand, if a frame rate is made high, it may be necessary to raise the power of one irradiation so that detection accuracy is not dropped, which results in increased power consumption. Thus, frame rate and detection accuracy have a tradeoff relationship with respect to power consumption.

In embodiments of the present disclosure, two methods are proposed as a control method for dynamically controlling a frame rate of a distance detection device. A first method is a method of determining a frame rate in a current frame based on a distance relative to an object detected in an immediately preceding frame with a distance detection device. For example, suppose the detection range of an object with a distance detection device is 0 to 200 centimeters. Further, suppose in the range of 0 to 100 centimeters a frame rate of 50 frames per second (FPS) is applied, and in the range of 100 to 200 centimeters a frame rate of 25 FPS is applied. This results in a time-per-frame in the two ranges of 20 milliseconds and 40 milliseconds, respectively. Here, if the light emission interval of the light emitting device is fixed at 10 milliseconds, the frequency of light emission of the light emitting device will be two times and four times for these ranges, respectively. When some light reception of reflected light occurs within one frame, signals s1 and s2 are generated based on the electrical charge accumulated in response to the light reception. Therefore, when the distance of an object is far, the accumulated amount of electrical charge generated by a light sensor may be raised by dynamically adjusting the frame rate and controlling the light received within the frame. As a result, degradation of detection accuracy by the increase in detection distance can be moderated without a corresponding rise in the average electric current value per time when the distance is being measured.

Figure 3:
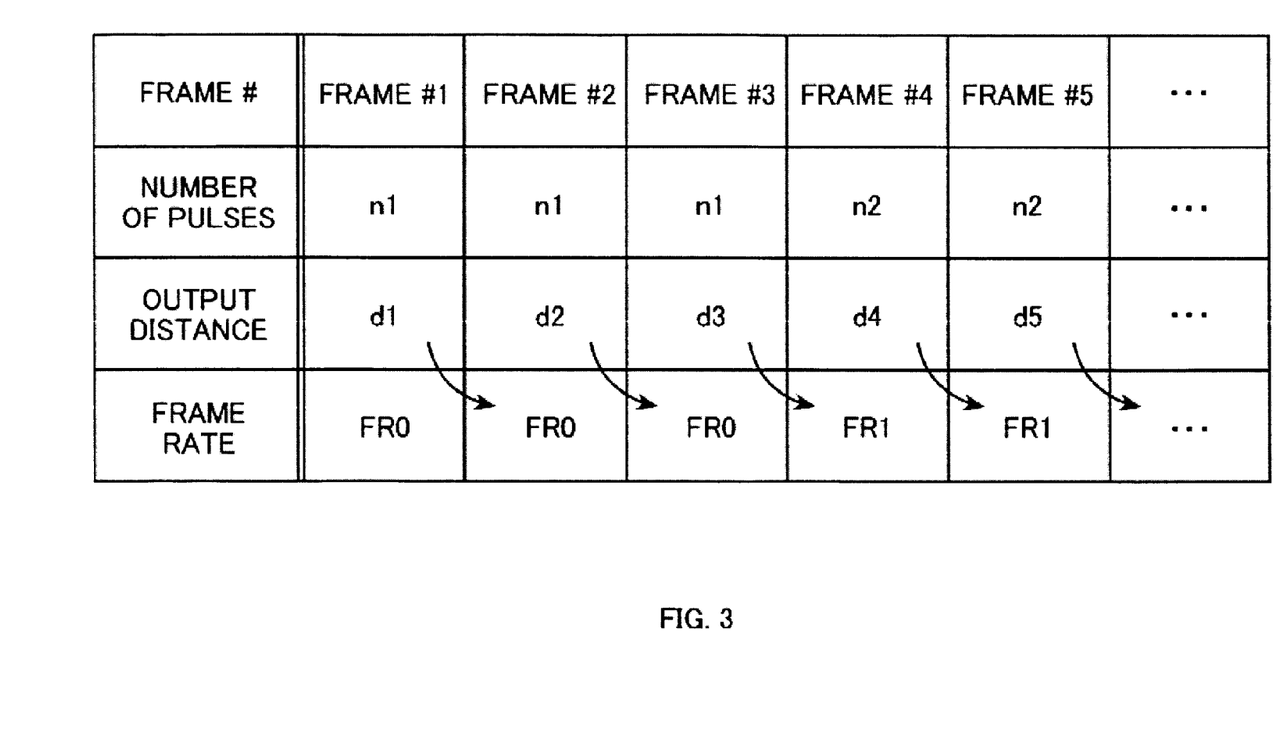
FIG. 3 illustrates a non-limiting exemplary table demonstrating a dynamic change in frame rate for a TOF distance detection device, according to certain embodiments.

FIG. 3 illustrates a schematic example of a dynamically changing frame rate according to a first method. In the first method, whenever one frame is completed, the frame rate of the following frame is determined according to the detected distance (OUTPUT DISTANCE) in the completed frame. In the example of FIG. 3, frame #1 of frame rate FR0 includes n1 light pulses, and the distance detected in this frame is d1. At the time of completing frame #1, the frame rate of the following frame #2 is determined based on this distance d1. In this example, the frame rate in frame #2 is maintained at frame rate FR0. Accordingly, the number of light pulses in frame #2 remains at n1. If the distance between an object and the light emitting device does not change in frame #1 and frame #2, the output distance d2 of frame #2 becomes the same as the distance d1 detected in frame #1. Because the distance d2 remains unchanged, the frame rate in frame #2 is also maintained at frame rate FR0.

In frame #3, it is assumed that the distance between the object and the distance detection devices increases relative to the distance from frame #2. In this example, it may be assumed that the distance in frame #4 increases above a predetermined threshold distance. In such a case, although the detection accuracy of the output distance d3 of frame #3 is low, it can be utilized for far and near determinations of distance of an object. Based on this output distance d3, a frame rate in the following frame #4 is changed from frame rate FR0 to frame rate FR1. That is, when the output distance d3 increases over the predetermined threshold boundary, the controller 110 selects a lower frame rate FR1 and applies the decreased frame rate FR1 to the subsequent frame #4. While the output distance d4 may not change with respect to the output distance d3 in frame #3, the detection accuracy increases in frame #4 relative to frame #3 due to the change in the frame rate. Assuming the output distance d5 is the same as the output distance d4 from frame #4, the frame rate in frame #5 remains at frame rate FR1.

Although the method of determining a frame rate of a current frame based on a distance calculated for a preceding frame is not specifically limited by the present disclosure, one or more embodiments according to the present disclosure may utilize stored data tables that store information related to frame rates corresponding to various distance ranges. For example, FIGS. 4A and 4B illustrate data tables that may be implemented for setting a frame rate in a current frame based on a distance detected in an immediately preceding frame, according to certain embodiments.

Figure 4A:
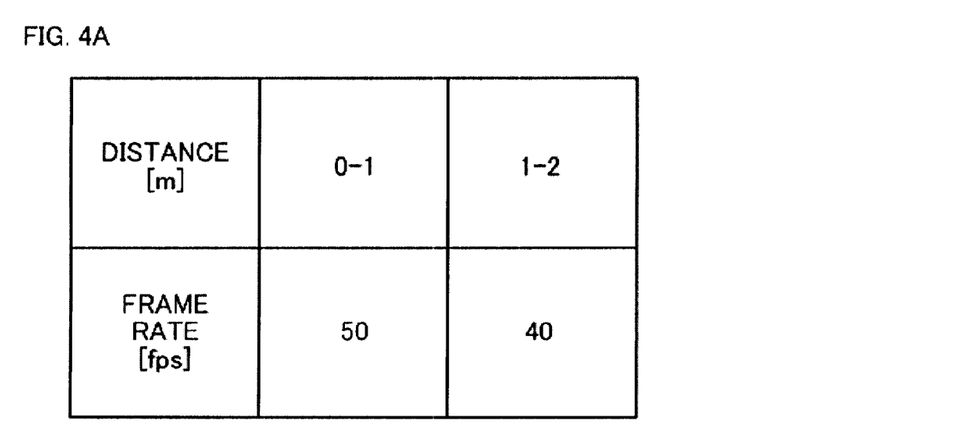
FIGS. 4A and 4B illustrate non-limiting examples of frame rates corresponding to various measured distances determined by a TOF distance detection device, according to certain embodiments.

Referring first to FIG. 4A, the data table in FIG. 4A is assumed to be implemented for a distance measurement range of 0 to 2 meters. The total distance detection range in this example is divided into two periods (i.e., 0 to 1 meters, and 1 to 2 meters). Frame rates corresponding to each distance detection range segment are shown in the bottom row of the data table. Specifically, the distance range segment of 0 to 1 meter has an associated frame rate of 50 frames per second, and the distance detection range of 1 to 2 meters has a corresponding frame rate of 40 frames per second. Applying the data included in the table of FIG. 4A to the dynamic frame rate processing according to the first method of the present disclosure, if a distance in a current frame is determined to be within the range of 0 to 1 meters, the distance detection device sets the frame rate in the immediately subsequent frame to a frame rate of 50 frames per second. Similarly, if the distance detected within a current frame is within the range of 1 to 2 meters, the distance detection device sets the frame rate in the immediately subsequent frame to a frame rate of 40 frames per second.

Figure 4B:
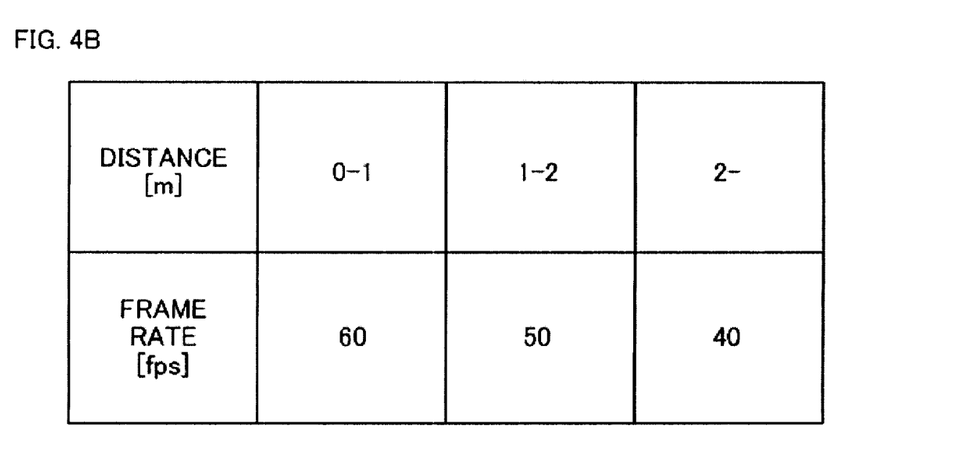

Referring now to FIG. 4B, FIG. 4B illustrates a case in which the detection range is increased to a detection range of 2 meters or more, and the total range of the distance detection device is divided into three segments. Specifically, the table in FIG. 4B includes segments corresponding to distance ranges of 0 to 1 meters, 1 to 2 meters, and greater than 2 meters. The bottom row of the table in FIG. 4B includes frame rates corresponding to each distance range segment. Specifically, the distance range of 0 to 1 meters has a corresponding frame rate of 60 frames per second, the distance range of 1 to 2 meters has a corresponding frame rate of 50 frames per second, and the distance range of greater than 2 meters has a corresponding frame rate of 40 frames per second. A similar determination of dynamically determining a frame rate in a current frame based on a distance detection result in an immediately preceding frame may be implemented using the data in the table of FIG. 4B in a similar manner as the example discussed above for FIG. 4A.

It is noted that while the examples of FIG. 4A and FIG. 4B illustrate examples of detection ranges and segments of detection ranges in corresponding frame rate that may be applied in certain embodiments, the present disclosure is not limited to any particular distance detection range or number of segments for dynamically controlling a frame rate of a distance detection device.

Figure 5:
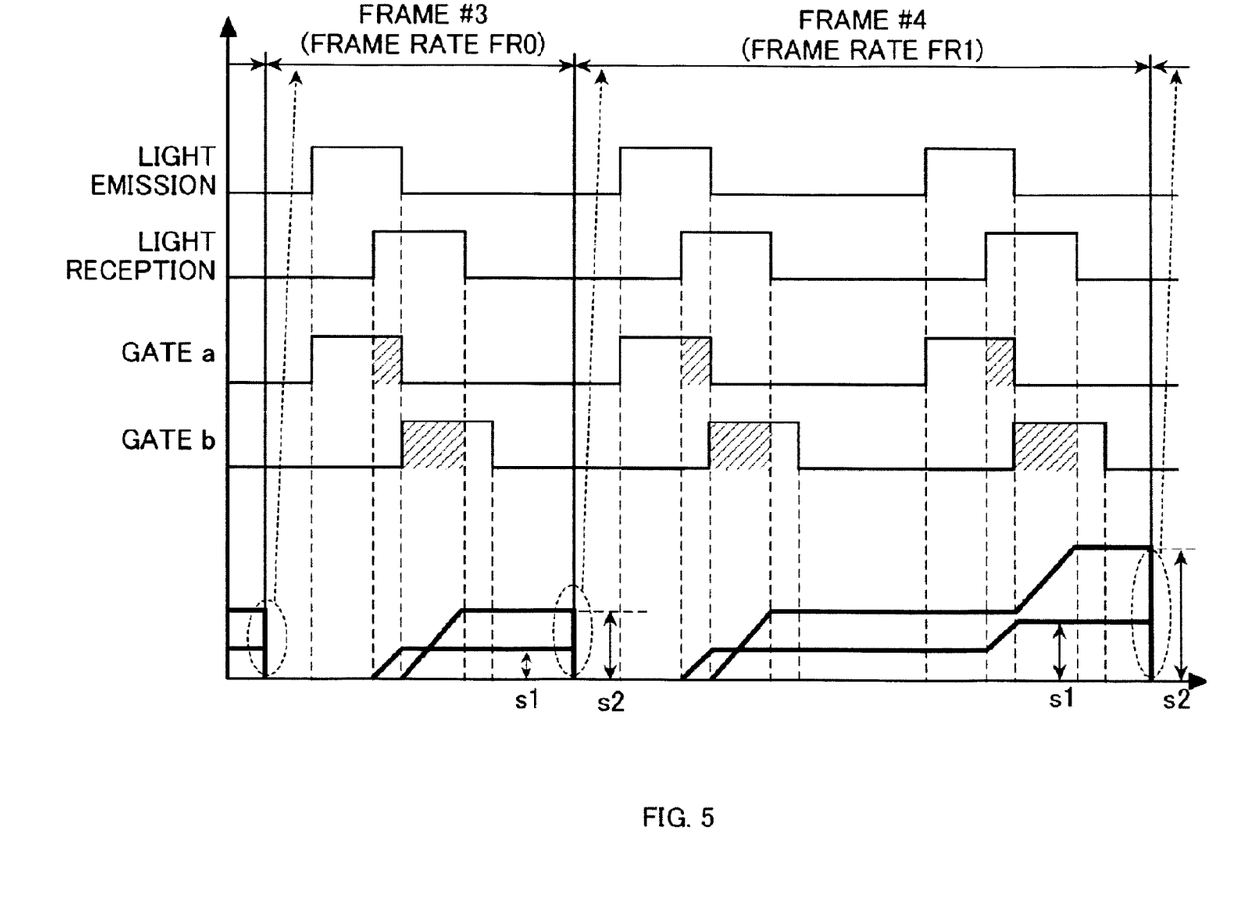
FIG. 5 illustrates a non-limiting exemplary waveform diagram demonstrating a dynamic change in frame rate of a TOF distance detection device, according to certain embodiments.

Next, FIG. 5 illustrates a wave form diagram including various signals for demonstrating the dynamic control of frame rate in a distance detection device in embodiments implementing the first method. The names of the various signals included in the diagram of FIG. 5 were discussed previously with respect to FIG. 2 and therefore, a discussion of what these signals represent will not be repeated here. Further, the example of FIG. 5 further illustrates processing with respect to frames #3 and #4, which were discussed with respect to FIG. 3.

Referring to FIG. 5, frame #3 of frame rate FR0 includes one light pulse, and this example assumes that electrical charges in the amounts of s1 and s2 were obtained at the time of completing frame #3. Based on the electrical charge amounts s1 and s2 determined at the end of frame #3, the distance D may be calculated for the frame #3. Based on the calculated distance D for frame #3, the frame rate corresponding to frame #4 may be dynamically controlled by comparing the calculated output distance with corresponding frame rates stored in a data table, such as the data tables illustrated in FIGS. 4A and 4B. In the example of FIG. 5, the output distance D is assumed to correspond to a frame rate FR1. As shown in the graph of FIG. 5, by increasing the frame rate in frame #4 with respect to the frame rate from frame #3, and assuming that the transmission interval of light pulses remains fixed, the increase in frame rate to frame rate FR1 results in two light pulses being emitted within frame #4. Accordingly, the amount of stored charge s1 and s2 increases as a result of receiving the light for both the first and second light pulses. Similarly to frame #3, the output distance D may be calculated in frame #4 based on the accumulated electrical charge s1 and s2, and the frame rate of frame #5 may be controlled based on the output distance calculated for frame #4.

Figure 6:
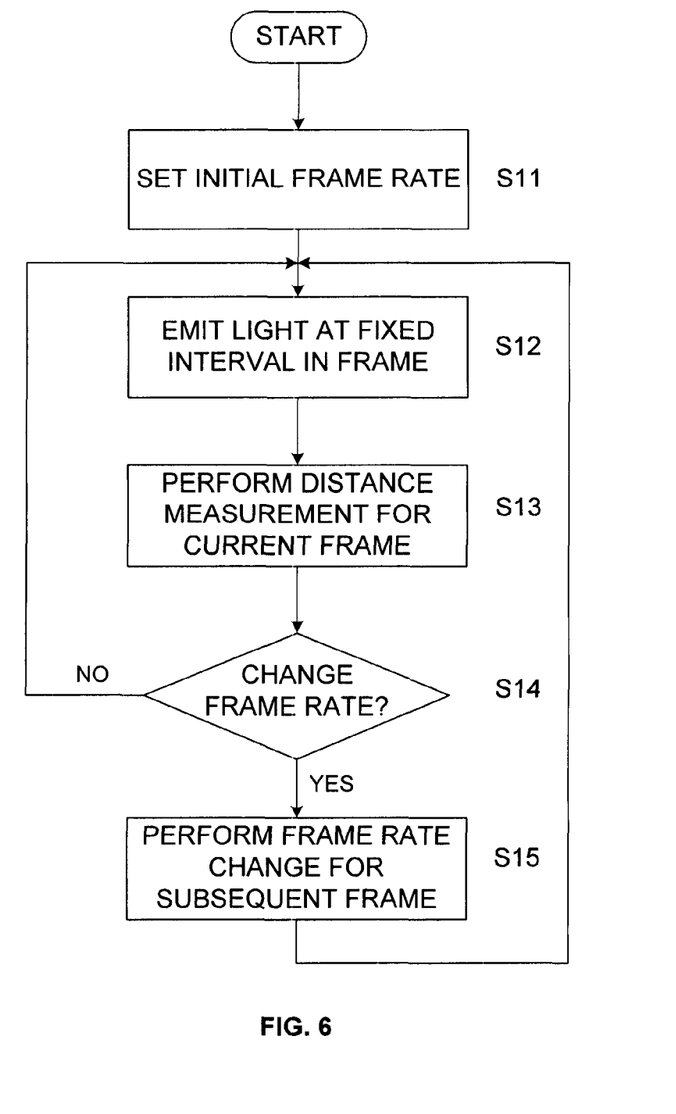
FIG. 6 illustrates a non-limiting exemplary flowchart corresponding to processing for dynamically controlling a frame rate of a TOF distance detection device, according to certain embodiments.

Next, FIG. 6 illustrates a non-limiting exemplary flowchart corresponding to processing for dynamically controlling a frame rate for a TOF distance detection device according to the first method.

At step S11, the controller 11 sets an initial frame rate for the distance detection in the first frame.

At step S12, based on the initial frame rate set at step S11, the light emitting device 13 emits at least one light pulse at a fixed emission interval. For example, the light emitting device 13 may emit a series of 10 millisecond light pulses at a fixed interval within the initial frame.

At step S13, the controller 11 performs a distance measurement for the current frame based on the accumulated charge amounts s1 and s2 generated when the light emitted at step S12 is reflected from an object from which the distance is being measured and received by the light receiving device 15.

At step S14, the controller 11 determines, based on the distance calculated at step S13, whether the frame rate in the immediately subsequent frame with respect to the current frame should be dynamically changed. For example, in certain embodiments, the controller 11 may compare the distance calculated at step S13 with data in a data table including corresponding frame rates, such as the data tables shown in FIGS. 4A and 4B. If the controller 11 at step S14 determines that the frame rate in the subsequent frame should not be changed, the process returns to step S12.

Otherwise, at step S15, the controller 11 performs processing for dynamically controlling the frame rate such that the frame rate in the subsequent frame changes to the frame rate determined at step S14. The process then returns to step S12 where the process is repeated for a series of frames.

Next, a second method of dynamically controlling a frame rate in a series of frames including at least one light pulse will be explained. According to the second method of dynamically controlling a frame rate, when the accumulated charge is generated by at least one of the light sensors 15a and 15b exceeds a predetermined threshold level, the controller 11 terminates the current frame. According to the first method of dynamically controlling the frame rate, the frame rate of the frame immediately subsequent to the current frame was determined at the time of finishing the current frame. In other words, the frame rate of a certain frame was determined before the start of the frame. In contrast, a frame rate is not determined in the second method before the start of a frame, but instead the frame rate in the current frame is decided based on a result determined at the time of finishing the current frame. The second method has an advantage in that it can optimize frame rates which include the influence of light quantity change factors other than the distance of an object with respect to the light sensor (e.g., reflectance of an object, it originates in a color, etc.).

Figure 7:
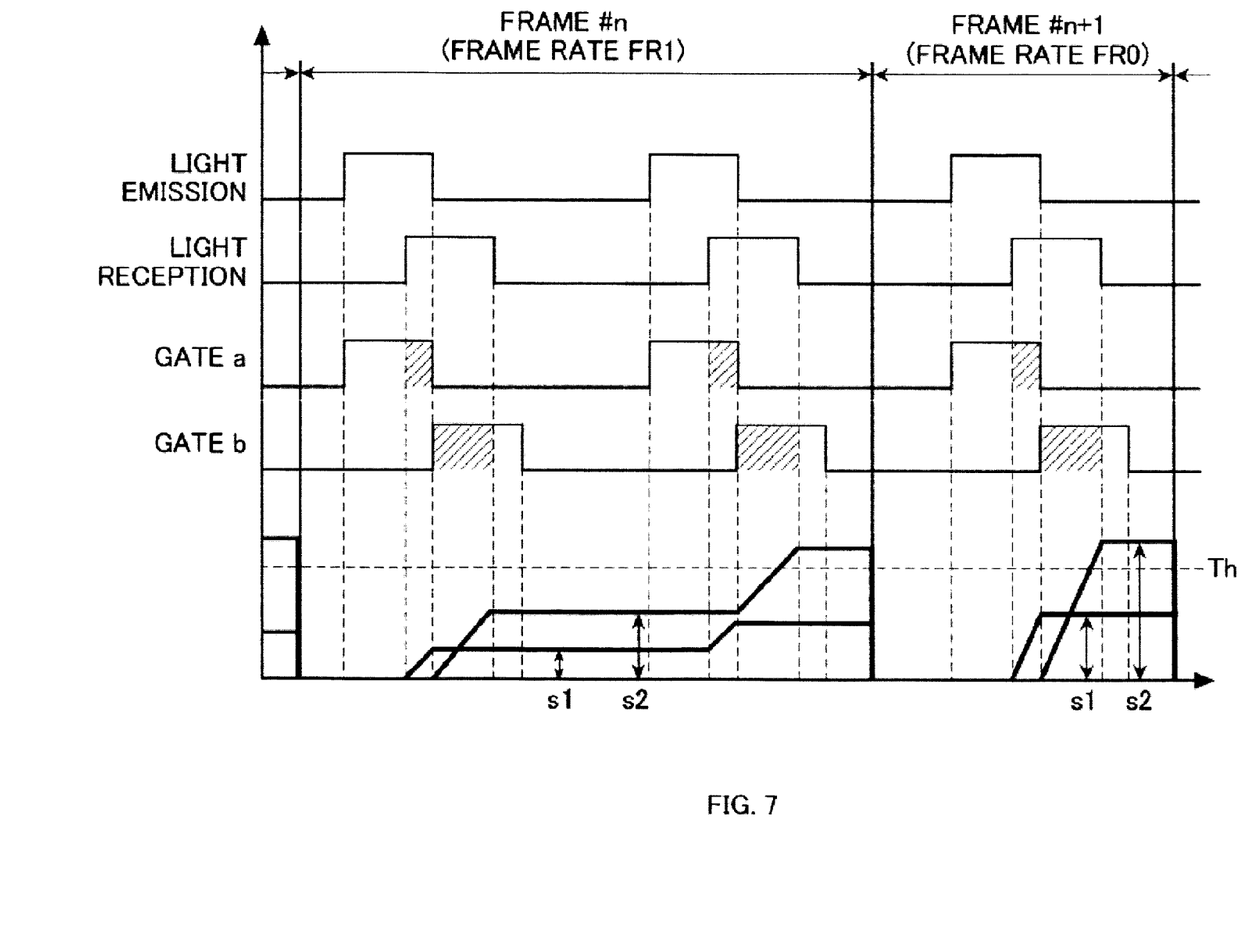
FIG. 7 illustrates a non-limiting exemplary waveform diagram demonstrating another dynamic change in frame rate of a TOF distance detection device, according to certain embodiments.

FIG. 7 illustrates a non-limiting exemplary wave form diagram demonstrating processing related to the dynamic control of a frame rate for a TOF distance detection device according to the second method.

Referring to FIG. 7, it is assumed for this example that the amount of stored charge amounts s1 and s2 obtained from the first light pulse does not exceed the level of a predetermined threshold value Th in frame #n. As a result, the controller 11 determines that frame #n is not completed at this time, and the controller 11 extends the frame #n so that the light pulse of a second pulse may be included within the frame. As a result, the light sensors 15a and 15b will receive light from the additional pulse, thereby increasing the amount of stored charge amounts s1 and s2. As shown in the lower portion of the graph in FIG. 7, as a result of receiving light and storing charge corresponding to the second light pulse in frame #n, the store charge amount s2 increases above the threshold value Th. As a result of the store charge amount s2 exceeding the threshold value Th, frame #n is completed at this time. Additionally, the frame rate (here FR1) of frame #n is determined at this time. In the second method of dynamic frame control, even if one of the store charge amounts s1 and s2 exceeds a threshold value, the current frame is not completed until the other amount of store charge is calculated.

While the example shown in FIG. 7 illustrates a case in which the stored charge amount s2 exceeds the threshold value Th within frame #n after receiving the second light pulse, there may be a case in which the stored charge amount does not exceed the threshold value after receiving the second light pulse. In response, the controller 11 may dynamically control the frame rate of frame #n such that the frame rate is extended so as to include a third light pulse within the frame. In certain embodiments, frame rate control according to the second method may be performed sequentially by continuously increasing the frame rate while the stored charge amounts s1 and s2 remain below the threshold value Th. However, certain implementations may include an upper limit for time in which the current frame may be extended by the controller 11. After the completion of the upper time limit for extending the current frame, the controller 11 may forcibly terminate the current frame. This provides the benefit of not continuously extending the current frame in perpetuity.

Referring still to FIG. 7, the frame #n+1 begins at a start time corresponding to the subsequent frame. However, a frame rate of the frame #n+1 has not been fully determined at this time. In this example, it is assumed that there is a case where the reflected light amount in frame #n+1 is large relative to the light amount received in frame #n. As a result of the increase in the received amount of light in frame #n+1, the amount of stored charge s2 increases above the threshold value Th following the reception of the first light pulse. As a result of determining that the stored charge amount s2 increases above the threshold value Th, the controller 11 determines that the frame #n+1 is finished before the following light pulse is emitted. Additionally, the controller 11 determines the frame rate of the frame #n+1 (here frame rate FR0).

Figure 8:
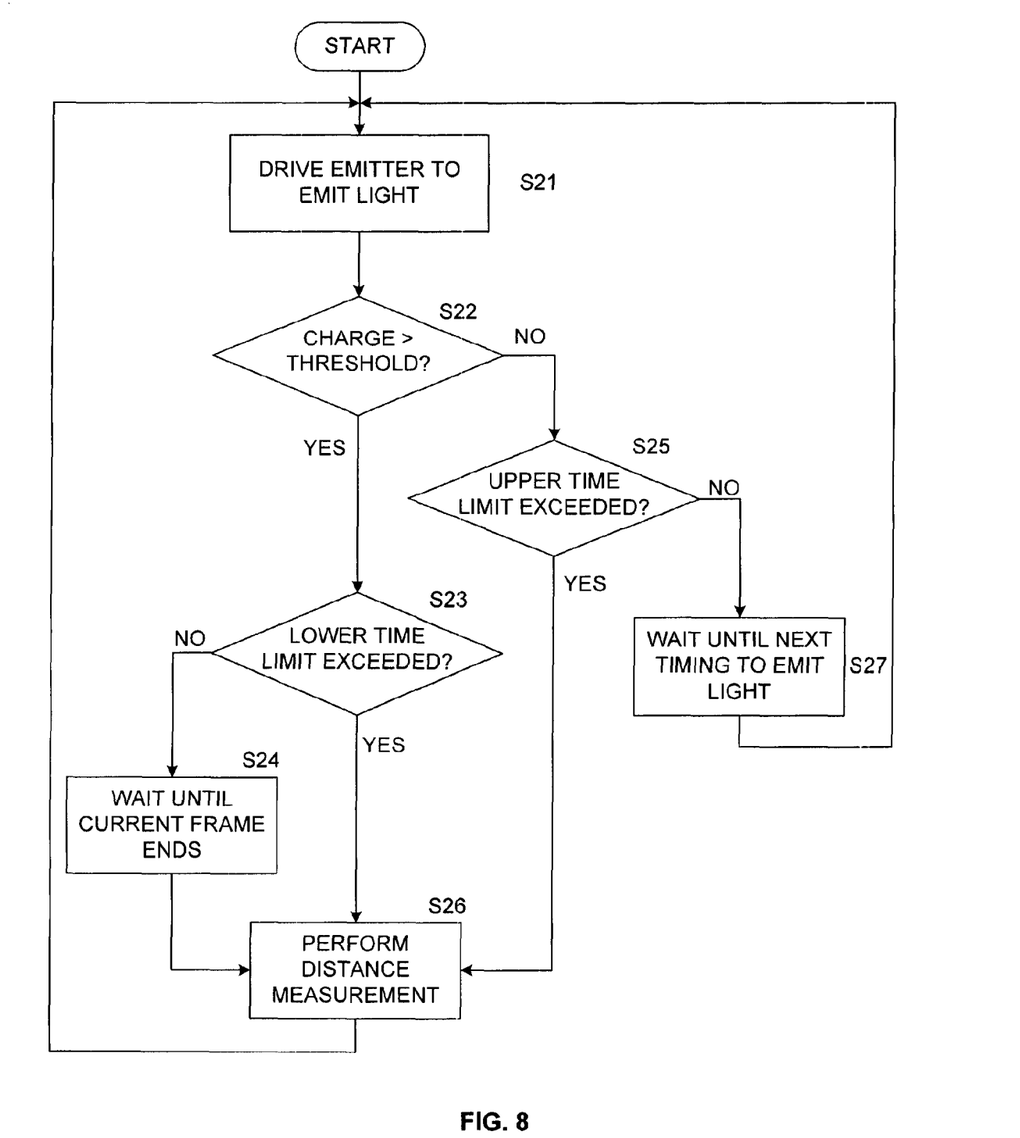
FIG. 8 illustrates a non-limiting exemplary flowchart corresponding to additional processing for dynamically controlling a frame rate of a TOF distance detection device, according to certain embodiments.

Next, FIG. 8 illustrates a non-limiting exemplary flow chart corresponding to processing for dynamically controlling a frame rate for a TOF distance detection device according to the second method.

Referring to FIG. 8, at step S21, the controller 11 drives the light emitting device 13 such that at least one light pulse is generated within the current frame.

At step S22, the controller 11 determines the charge stored amounts s1 and s2 generated during receipt of the at least one light pulse from step S21, and determines if at least one of the charge stored amounts s1 and s2 is greater than a predetermined threshold value.

If the controller 11 at step S22 determines that neither of the charge stored amounts s1 and s2 is greater than the predetermined threshold, the process proceeds to step S25. Otherwise, the process proceeds to step S23.

At step S23, the controller 11 determines whether a minimum time of one frame has elapsed since the emission of the at least light pulse from the light emitting device 13 at step S21. If the controller 11 determines at step S23 that the lower time limit has not been exceeded, the process proceeds to step S24. Otherwise, the process proceeds to step S26.

At step S24, the controller 11 waits until the current frame is completed (i.e., until the minimum time elapses for one frame) and then proceeds to step S26.

At step S25, the controller 11 determines whether an upper limit time threshold has been exceeded. The upper limit time threshold corresponding to step S25 may be suitably selected such that the distance determination and dynamic frame control according to the second method does not continue in perpetuity (e.g., the frame rate is not continuously extended due to the stored charge amount(s) not exceeding the threshold value Th). If the controller 11 determines at step S25 that the upper time limit is exceeded, the process progresses to step S26. Otherwise, the process progresses to step S27.

At step S26, the controller 11 performs a calculation of the distance between the distance detection device and the object based on the stored charge amounts s1 and s2. The process of FIG. 8 then returns to step S21 following the distance calculation.

At step S27, the controller 11 waits until the next timing to emit a subsequent light pulse, based on the fixed emission interval.

It should be appreciated that for both the first and second methods of dynamic frame control described in the present disclosure, the explicit values described in the examples provided herein are not limiting, and the present disclosure is not limited to any particular value of the initial frame rate value, the phase number of the changing of the frame rate, the upper and lower time limits, etc., and any arbitrary values may be applied. Further, a light emission interval is not restricted to 10 milliseconds for the purposes of the present disclosure.

Figure 9:
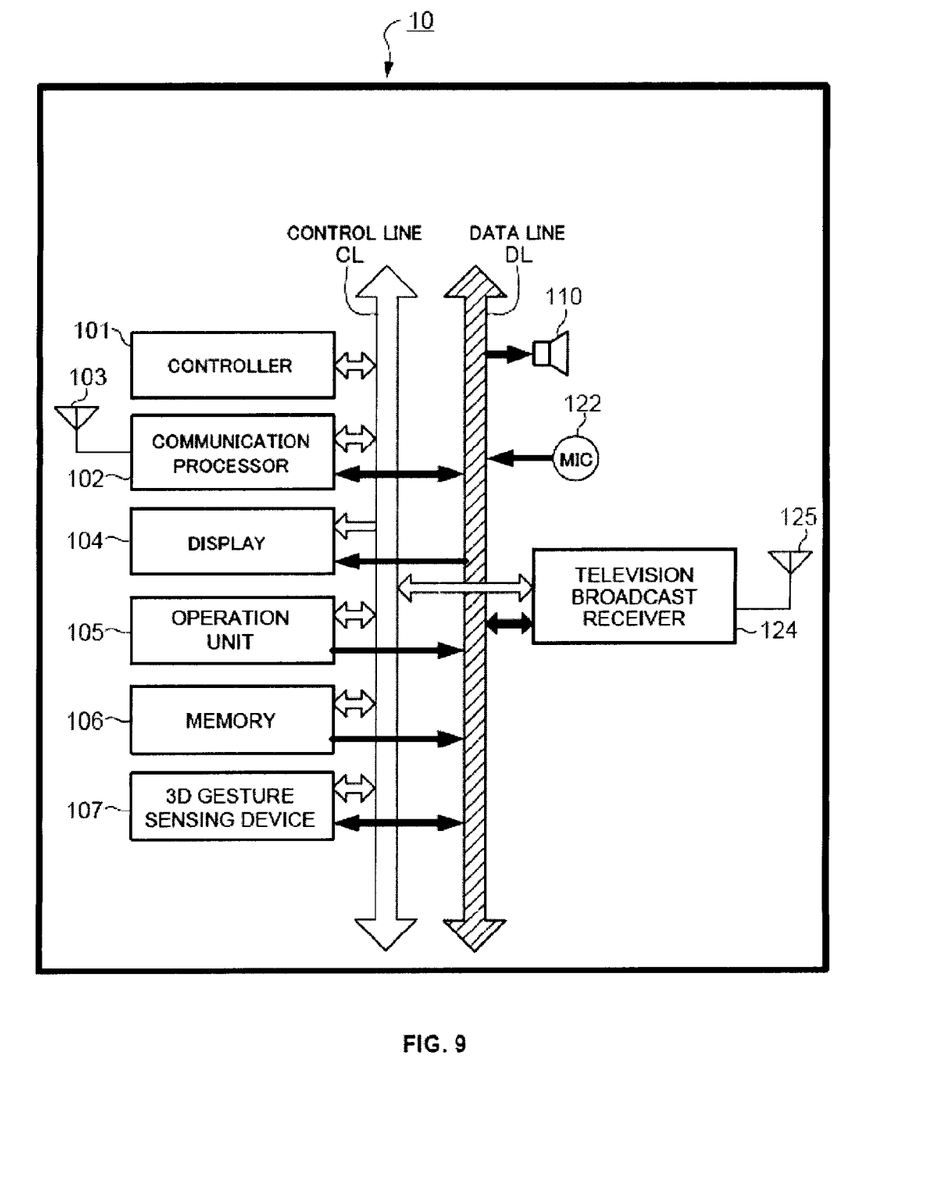
FIG. 9 illustrates a non-limiting exemplary block diagram corresponding to a terminal device for implementing dynamic frame rate control processing, according to certain embodiments.

Next, FIG. 9 illustrates a non-limiting exemplary block diagram corresponding to a terminal device for implementing dynamic frame rate control processing according to certain embodiments. Specifically, the example illustrated in FIG. 9 includes a display apparatus 10 provided with a three-dimensional (3D) gesture sensing device 107 that implements a dynamic frame rate control method in accordance with the present disclosure. The display apparatus 10 of FIG. 9 may, e.g., be implemented as any arbitrary device that includes a display, such as a television receiver, a personal computer (PC), a tablet, etc.

The display apparatus 10 includes a control line 150 and a data line 160, and is comprised of the following various functional elements that communicate control signals and other data signals across these lines: a controller 101, a communication processor 102 connected to antenna 103, a display 104, an operation unit 105, a memory 106, the 3D gesture sensing device 107, a speaker 110, a microphone 122, and a television broadcast receiver 124 connected to antenna 125. Additionally, the display apparatus 10 may include various other components not explicitly providing in the example of FIG. 9. Further, elements shown in FIG. 9 may be optionally omitted in certain implementations. For example, the television broadcasting receiver 124 is not an essential element to the display apparatus 10 and/or distance detection processing according to the present disclosure and therefore, this element may be optionally omitted in certain implementations.

The controller 101 may include one or more central processing units (CPUs), and may control each element in the display apparatus 10 to perform features related to communication control, audio signal processing, control for the audio signal processing, image processing and control, and other kinds of signal processing. For example, in certain embodiments, the controller 101 may control elements in the display apparatus 10 based on a process of monitoring and managing the output of the 3D gesture detection apparatus

107. The controller 101 may perform these features by executing instructions stored in the memory 106. Alternatively or in addition to the local storage of the memory 106, the features may be executed using instructions stored in an external device accessed on a network or on a non-transitory computer readable medium.

The communication processor 102 controls communications performed between the terminal device 100 and other external devices via the antenna 101 or another connection (e.g., a wired connection). For example, the communication processor 102 may control communication between base stations for cellular telephone communication. Additionally, the communication processor 102 may control wireless communication performed with the other external apparatuses according to protocols such as Bluetooth, IEEE 802.11, and near field communication (NFC); or wired or wireless communication on a network (e.g., the Internet) using, e.g., an Ethernet connection.

The antenna 103 transmits/receives electromagnetic wave signals between base stations for performing radio-based communication, such as the various forms of cellular telephone communication.

The display 104 may be a liquid crystal display (LCD), an organic electroluminescence display panel, or another display screen technology. In addition to displaying still and moving image data, the display 104 may display operational inputs, such as numbers or icons, which may be used for control of the display apparatus 10. The display 104 may additionally display a graphical user interface with which a user may control aspects of the display apparatus 10. Further, the display 104 may display characters and images received by the display apparatus 10 and/or stored in the memory 106 or accessed from an external device on a network. For example, the display apparatus 10 may access a network such as the Internet and display text and/or images transmitted from a Web server.

The operation unit 105 may include one or more buttons similar to external control elements (e.g., power control, volume control, standby control, etc.) for providing an operational interface on which the user may control the display apparatus 10. The operation unit 105 may generate an operation signal based on a detected input corresponding to one of the buttons, switches, etc. The operation signals generated by the operation unit 105 may be supplied to the controller 101 for performing related processing control of the display apparatus 10. In certain embodiments, the operation unit 105 may be integrated as a touch panel display within the display 104.

The memory 106 may include, e.g., Read Only Memory (ROM), Random Access Memory (RAM), or a memory array comprised of a combination of volatile and non-volatile memory units. The memory 106 may be utilized as working memory by the controller 101 while executing the processing and algorithms of the present disclosure, or to store other instructions corresponding to processing performed by the controller 101 (e.g., operating system instructions). Additionally, the memory 106 may be used for long-term storage, e.g., of images and information related thereto.

The 3D gesture sensing device 107 includes one or more sensors that can detect 3D motion of detection targets, such as a finger of a user's hand. For example, array-type distance sensors included in the 3D gesture sensing device 107 may detect a distance from the display apparatus 10 relative to on object within a detection range of the sensors. In certain embodiments, it is also possible to acquire distance image information by measuring the time, in real-time for every pixel, from when projected light from the sensors strikes upon a target and returns to a CMOS image sensor corresponding to an array-like pixel. Thus, the stereo image of a target is measurable.

The speaker 110 emits an audio signal corresponding to audio/voice data supplied from the display apparatus 10.

The microphone 122 detects surrounding audio, and converts the detected audio into an audio signal. The audio signal may then be output to the controller 101 for further processing.

The television broadcasting receiver 124 receives image and audio signal data via the antenna 124 or another wired or wireless connection. The television broadcasting receiver 124 performs signal processing on the received image and audio signal data such that the data may be reproduced on the display apparatus 10 via the display 104.

Figure 10:
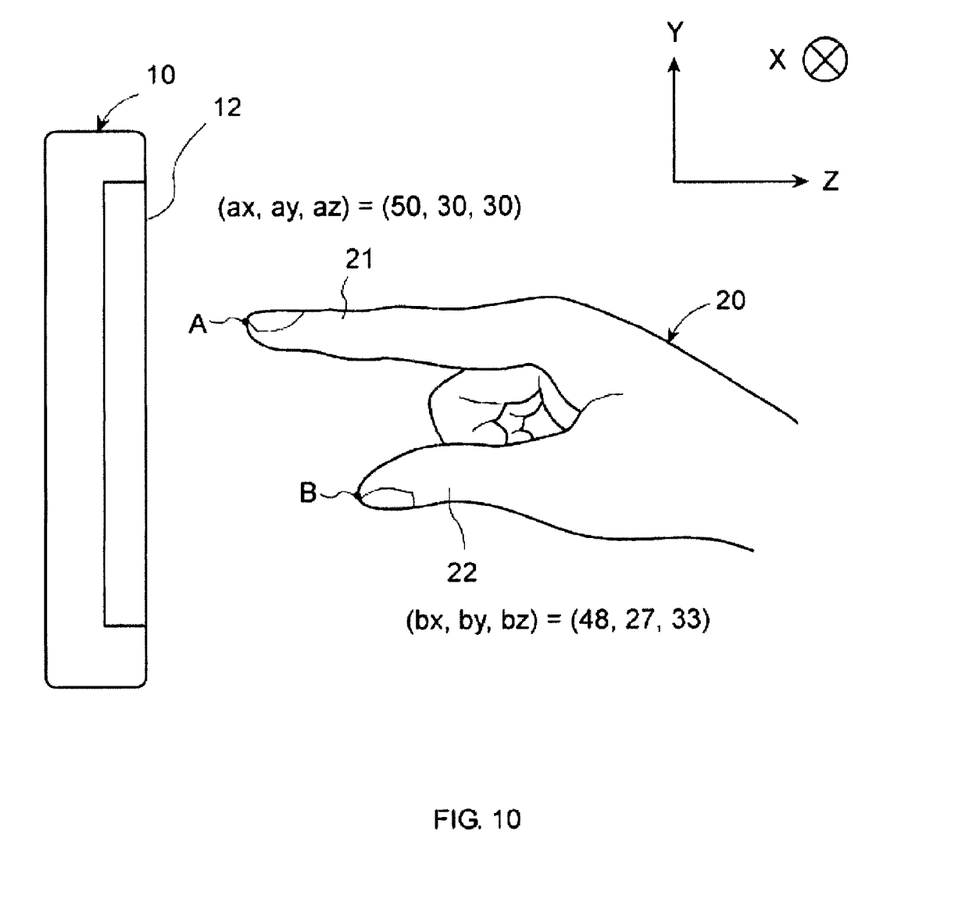
FIG. 10 illustrates an exemplary target detection using the terminal device of FIG. 9.

Next, FIG. 10 illustrates an exemplary target detection using the terminal device of FIG. 9. Specifically, FIG. 10 is an explanatory drawing of a user's hand in a detection space of the 3D gesture sensing device 107.

As shown in FIG. 10, the detection space in this example is set in front of (i.e., the viewing space) of the display 12. For the purposes of this example, the y-axis of the display 12 is the up-down direction and x-axis is the left-right direction relative to the display 12 surface. A direction vertical to the display 12 is the z-axis. In this case, a direction perpendicular to the display 12 corresponds to the z-axis direction of an associated detection sensor in the 3D gesture sensing device 107.

For the purposes of the present disclosure, when a gesture involves using the user's index finger, the feature points of not only one point of the tip of an index finger, but also another finger or a hand may be collectively utilized. Further, while the examples discussed herein perform detection processing with respect to a user's hand, one of ordinary skill in the art will appreciate that the gesture detection processes described herein may be adapted to detect gestures and feature points related to other objects.

The position of each tip of the fingers 21 and 22 may be detected by 3D gesture sensing device 107 as features points A and B. In certain embodiments, the 3D gesture sensing device 107 may perform processing for distinguishing between a first instruction operation (e.g., a scroll operation) and a second instruction operation (e.g., a click operation) based on time-series data related to three parameters: the coordinates of the first point A, the coordinates of the second point B, and the distance between points A and point B. For example, a user's gesture may be monitored by the 3D gesture sensing device 107, and the coordinates of the first point A at the tip of the index finger 21 and the coordinates of the second point B at the tip of the thumb 22 may be acquired periodically. Simultaneously, the distance between the first point A and the second point B may be computed from the determined coordinates of both points.

For the purposes of the present disclosure, when a gesture involves using the user's index finger, the feature points of not only one point of the tip of an index finger but another finger or a hand may be collectively utilized. Further, while the examples discussed herein perform detection processing with respect to a user's hand, one of ordinary skill in the art will appreciate that the gesture detection processes described herein may be adapted to detect gestures and feature points related to other objects.

Processing related to distinguishing between, and executing processing related to, detected instruction operations based on inputs received by the 3D gesture sensing device 107 is further described in U.S. application Ser. No. 14/183,171, the contents of which are incorporated herein by reference.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A distance detection device comprising: a light emitter configured to transmit light in a series of frames, wherein each frame in the series of frames includes at least one light pulse; a light receiver configured to receive, for each frame in the series of frames, the at least one light pulse when the at least one light pulse is reflected from a target, and generate, in response to receiving the at least one light pulse in a current frame of the series of frames, an output for calculating a distance between the target and the distance detection device for the current frame; and circuitry configured to calculate, for each frame in the series of frames, the distance between the target and the distance detection device based on the output of the light receiver, dynamically control a frame rate for each frame in the series of frames based on the distance calculated in a frame immediately preceding the current frame, and control the light emitter such that the at least one light pulse is emitted in the current frame at the frame rate calculated based on the distance in the immediately preceding frame.

(2) The distance detection device of (1), wherein the circuitry is configured to increase the frame rate with increasing distance between the target and the distance detection device.

(3) The distance detection device of (1) or (2), further comprising a memory that stores one or more frame rates respectively corresponding to distances calculated in the immediately preceding frame.

(4) The distance detection device of any one of (1) to (3), wherein the circuitry is configured to dynamically control the frame rate by matching the distance calculated in the immediately preceding frame rate with a corresponding frame rate, of the one or more frame rates stored in the memory.

(5) The distance detection device of any one of (1) to (4), wherein the light receiver includes at least two light sensors that detect the at least one light pulse.

(6) The distance detection device of any one of (1) to (5), wherein the circuitry is configured to control the at least two light sensors by outputting a gate signal to each of the at least two light sensors, wherein the gate signal controls a time interval during which light may be detected by the at least two light sensors.

(7) The distance detection device of any one of (1) to (6), wherein the gate signals output by the circuitry are offset in phase with respect to each other.

(8) The distance detection device of any one of (1) to (7), wherein the light receiver output represents an amount of electrical charge generated as a result of each of the at least two light sensors detecting the at least one light pulse during the time interval defined by the gate signal.

(9) The distance detection device of any one of (1) to (8), wherein the light receiver output includes an indication of the electrical charge represented by each of the at least two light sensors.

(10) The distance detection device of any one of (1) to (9), wherein the amount of the electrical charge is a function of one or more of an intensity and a detection duration of the at least one light pulse detected by each of the at least two sensors during the time interval defined by the gate signal.

(11) The distance detection device of any one of (1) to (10), wherein the circuitry is configured to calculate the distance between the target and the distance detection device based on the amount of the electrical charge.

(12) The distance detection device of any one of (1) to (11), wherein the light receiver output represents an amount of electrical charge generated by each of the at least two sensors as a result of each of the at least two light sensors detecting the at least one light pulse during the time interval defined by the gate signal.

(13) The distance detection device of any one of (1) to (12), wherein the circuitry is configured to determine whether one or more of the amounts of electrical charge generated by each of the at least two sensors exceeds a predetermined threshold level.

(14) The distance detection device of any one of (1) to (13), wherein when neither of the amounts of electrical charge generated by each of the at least two sensors exceeds the predetermined threshold level, the circuitry is further configured to dynamically control the frame rate by extending the current frame so as to include a detection of at least one more light pulse by the light receiver.

(15) The distance detection device of any one of (1) to (14), wherein the circuitry is configured to extend the current frame until one or more of the amounts of electrical charge generated by each of the at least two sensors exceeds the predetermined threshold level.

(16) The distance detection device of any one of (1) to (15), wherein the circuitry is configured to extend the current frame until one or more of the amounts of electrical charge generated by each of the at least two sensors exceeds the predetermined threshold level or until a predetermined time threshold is exceeded.

(17) The distance detection device of any one of (1) to (16), wherein the circuitry is configured to determine the frame rate of the current frame when one or more of the amounts of electrical charge generated by each of the at least two sensors exceeds the predetermined threshold level.

(18) The distance detection device of any one of (1) to (17), wherein the circuitry is configured to initiate a next frame following the determination of the frame rate corresponding to the current frame such that the frame rate of the current frame is determined as a result of ending the current frame.

(19) A method comprising: transmitting, by a light emitter, light in a series of frames, wherein each frame in the series of frames includes at least one light pulse; receiving, by a light receiver, for each frame in the series of frames, the at least one light pulse when the at least one light pulse is reflected from a target; generating, by the light receiver, in response to receiving the at least one light pulse in a current frame of the series of frames, an output for calculating a distance between the target and the distance detection device for the current frame; calculating, by circuitry, for each frame in the series of frames, the distance between the target and the distance detection device based on the output of the light receiver; dynamically controlling, by the circuitry, a frame rate for each frame in the series of frames based on the distance calculated in a frame immediately preceding the current frame; and controlling, by the circuitry, the light emitter such that the at least one light pulse is emitted in the current frame at the frame rate calculated based on the distance in the immediately preceding frame.

(20) A non-transitory computer readable medium having instructions stored therein that when executed by one or more processors cause a distance detection device to perform a method of dynamically controlling a frame rate corresponding to the distance detection device, wherein the distance detection device includes circuitry, a light emitter, and a light receiver, and the method comprises: transmitting, by the light emitter, light in a series of frames, wherein each frame in the series of frames includes at least one light pulse; receiving, by the light receiver, for each frame in the series of frames, the at least one light pulse when the at least one light pulse is reflected from a target; generating, by the light receiver, in response to receiving the at least one light pulse in a current frame of the series of frames, an output for calculating a distance between the target and the distance detection device for the current frame; calculating, by the circuitry, for each frame in the series of frames, the distance between the target and the distance detection device based on the output of the light receiver; dynamically controlling, by the circuitry, a frame rate for each frame in the series of frames based on the distance calculated in a frame immediately preceding the current frame; and controlling, by the circuitry, the light emitter such that the at least one light pulse is emitted in the current frame at the frame rate calculated based on the distance in the immediately preceding frame.

The invention claimed is:

1. A distance detection device comprising:
a light emitter configured to transmit light in a series of frames, wherein each frame in the series of frames includes at least one light pulse;
a light receiver configured to
receive, for each frame in the series of frames, the at least one light pulse when the at least one light pulse is reflected from a target, and
generate, in response to receiving the at least one light pulse in a current frame of the series of frames, an output for calculating a distance between the target and the distance detection device for the current frame; and
circuitry configured to
calculate, for each frame in the series of frames, the distance between the target and the distance detection device based on the output of the light receiver,
dynamically control a frame rate for each frame in the series of frames based on the distance calculated in a frame immediately preceding the current frame, and
control the light emitter such that the at least one light pulse is emitted in the current frame at the frame rate calculated based on the distance in the immediately preceding frame, wherein
the light receiver includes at least two light sensors that detect the at least one light pulse,
the circuitry is configured to control the at least two light sensors by outputting a gate signal to each of the at least two light sensors, wherein the gate signal controls a time interval during which light may be detected by the at least two light sensors,
the gate signals output by the circuitry are offset in phase with respect to each other,
the light receiver output represents an amount of electrical charge generated by each of the at least two sensors as a result of each of the at least two light sensors detecting the at least one light pulse during the time interval defined by the gate signal,
the circuitry is configured to determine whether one or more of the amounts of electrical charge generated by each of the at least two sensors exceeds a predetermined threshold level, and
when neither of the amounts of electrical charge generated by each of the at least two sensors exceeds the predetermined threshold level, the circuitry is further configured to dynamically control the frame rate by extending the current frame so as to include a detection of at least one more light pulse by the light receiver.

2. The distance detection device of claim 1, wherein the circuitry is configured to increase the frame rate with increasing distance between the target and the distance detection device.

3. The distance detection device of claim 1, further comprising
a memory that stores one or more frame rates respectively corresponding to distances calculated in the immediately preceding frame.

4. The distance detection device of claim 3, wherein the circuitry is configured to dynamically control the frame rate by matching the distance calculated in the immediately preceding frame rate with a corresponding frame rate, of the one or more frame rates stored in the memory.

5. The distance detection device of claim 1, wherein the amount of the electrical charge is a function of one or more of an intensity and a detection duration of the at least one light pulse detected by each of the at least two sensors during the time interval defined by the gate signal.

6. The distance detection device of claim 1, wherein the circuitry is configured to calculate the distance between the target and the distance detection device based on the amount of the electrical charge.

7. The distance detection device of claim 1, wherein the circuitry is configured to extend the current frame until one or more of the amounts of electrical charge generated by each of the at least two sensors exceeds the predetermined threshold level.

8. The distance detection device of claim 1, wherein
the circuitry is configured to extend the current frame until one or more of the amounts of electrical charge generated by each of the at least two sensors exceeds the predetermined threshold level or until a predetermined time threshold is exceeded.

9. The distance detection device of claim 1, wherein
the circuitry is configured to determine the frame rate of the current frame when one or more of the amounts of electrical charge generated by each of the at least two sensors exceeds the predetermined threshold level.

10. The distance detection device of claim 9, wherein
the circuitry is configured to initiate a next frame following the determination of the frame rate corresponding to the current frame such that the frame rate of the current frame is determined as a result of ending the current frame.

* * * * *